UNITED STATES PATENT OFFICE.

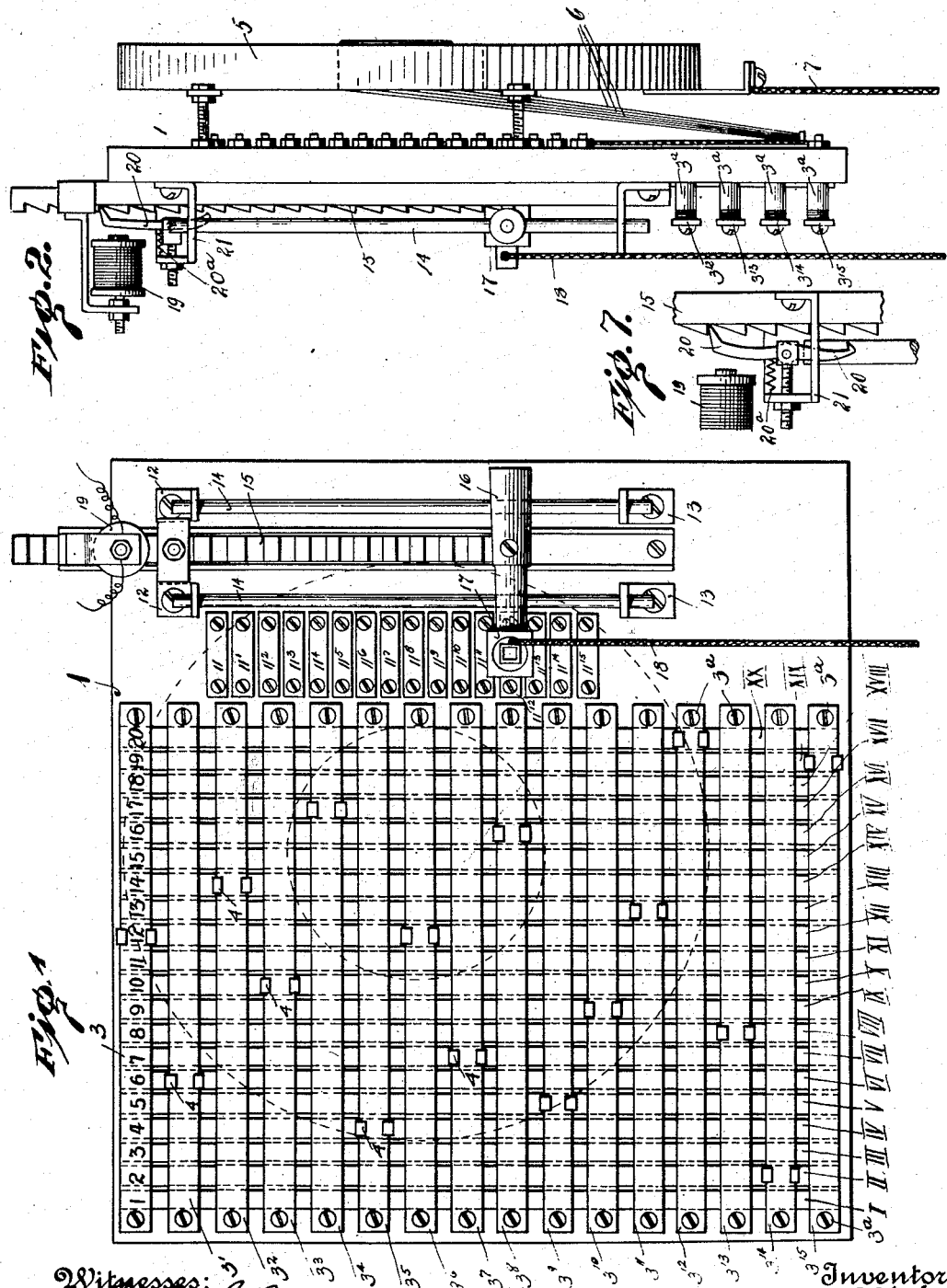

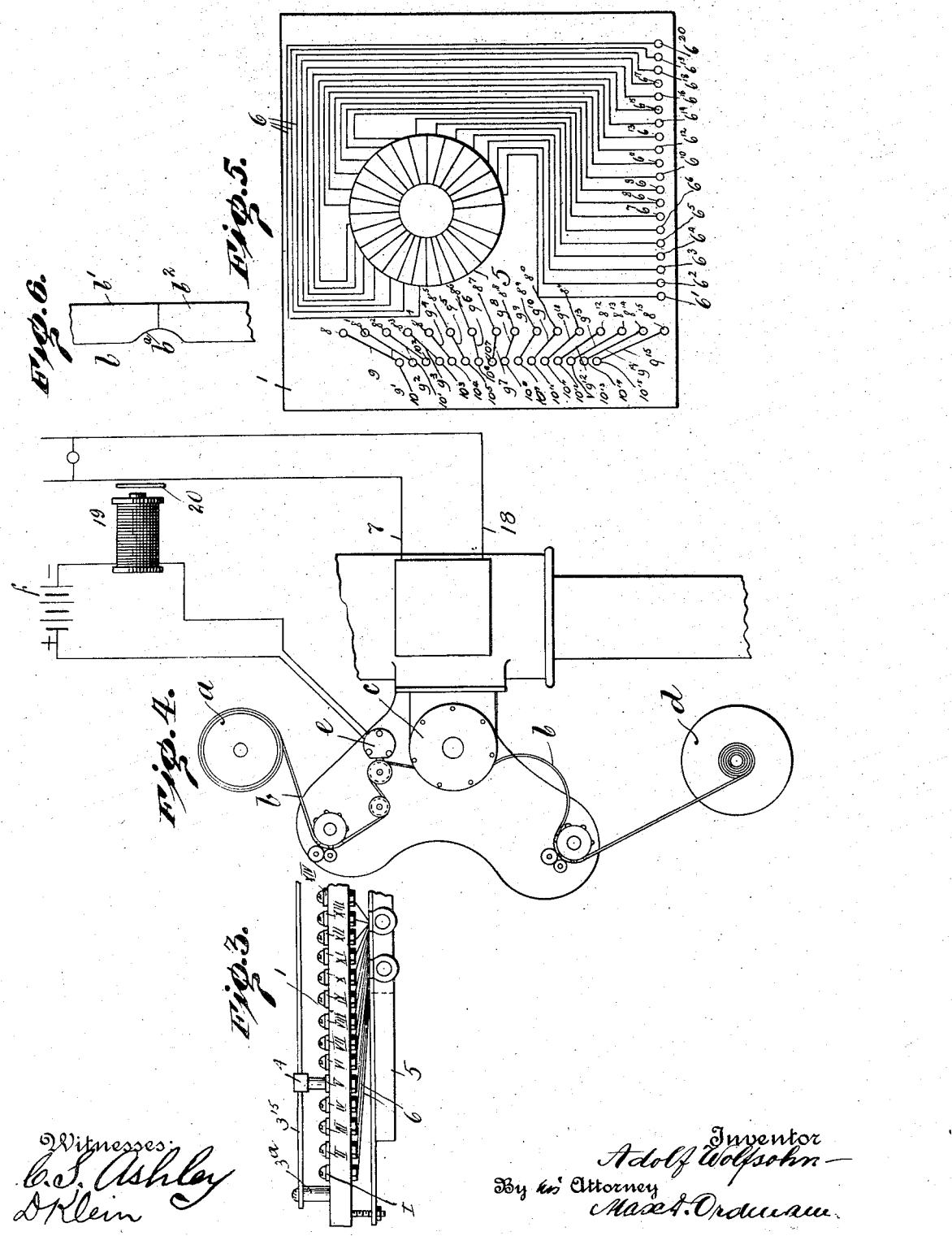

ADOLF WOLFSOHN, OF NEW YORK, N. Y., ASSIGNOR TO MOTION PICTURE APPLIANCE CORPORATION, OF NEW YORK, N. Y., A CORPORATION OF NEW YORK.

DEVICE FOR MOTION-PICTURE PRINTING.

1,136,194. Specification of Letters Patent. Patented Apr. 20, 1915.

Application filed December 26, 1913. Serial No. 808,821.

*To all whom it may concern:*

Be it known that I, ADOLF WOLFSOHN, a subject of the Russian Emperor, residing at New York, in the county of New York and State of New York, have invented certain new and useful Improvements in Devices for Motion-Picture Printing, of which the following is a specification.

The present invention relates to machines for printing motion picture films and particularly to a light adjusting mechanism therefor.

The strip of film usually contains a number of scenes requiring different lights for the printing from the negative on to the positive. Hitherto to regulate the light for the different scenes a dial was used, which dial carries an indicator fitted with an index pin by means of which the indicator may be set by the operator at any point to regulate the opening of the printing aperture. This arrangement requires the constant attendance of the operator so that at the time one scene has been printed and a new scene is brought into printing position the operator must change the position of the indicator for the next scene. With such structure, one has to entirely depend upon the watchfulness of the attendant and should it happen that the attendant missed to adjust the aperture changing mechanism for the next scene in proper time, the entire strip of film is spoiled.

The object of the present invention is to render the change of light automatic so as to dispense with the attendant and to thereby obtain a full automatic control of the change of light for any number of scenes contained on a single strip of film. By virtue of such an arrangement the attendant is able in advance to adjust for the different lights required for all scenes on the film so that at the completion of one scene the light will be automatically adjusted for the next scene.

To accomplish my object I provide a light changing mechanism which is automatically controlled so that at predetermined times the light for the different scenes will automatically adjust itself.

My invention consists in the construction, arrangement and combination of parts as fully set forth in the annexed claims.

My invention will be more fully understood by reference to the accompanying drawings, in which similar reference letters denote corresponding parts and in which—

Figure 1 shows a front elevation of my automatic adjusting device; Fig. 2 is a side elevation thereof; Fig. 3 is an end view of the apparatus; Fig. 4 is a part of the printing machine illustrating the feed of the negative film and the socalled "click" or electric switch; Fig. 5 shows the electric connections of my device with the rheostat and Fig. 6 denotes a part of a negative film with a notch therein arranged at the junction of two successive scenes.

I shall first describe so much of the printing machine and film feed as may be necessary to fully understand my new automatic adjusting device.

$a$ denotes a spool on which the strip $b$ of negative film is wound and from which it is conveyed around guide rollers past the aperture gate $c$ to the receiving roller $d$. The negative film $b$ has at one of its longitudinal edges a notch $b^a$ (Fig. 6) provided at the junction of each two successive scenes $b'$, $b^2$ and by virtue of these notches the negative film is adapted to operate in well known manner, the click or circuit closer $e$ controlling the circuit of the battery $f$ (Fig. 4). In the hitherto used machines this click was used to electrically control the change of printing aperture.

Coming now to my new automatic adjusting device, the same consists of a substantially rectangular plate or board 1 to which are affixed a number of vertically extending metal strips or electric contact pieces, I, II, III, etc. arranged adjacent and parallel to one another. Fixed by means of bolts $3^a$ to the board 1 and extending crosswise relative to and above the contact strips I, II,—XX are a series of bars 3, 3',—$3^{15}$ (Figs. 1 and 3) arranged in a vertical row above and parallel to one another. The number of these bars may be any desired one according to the maximum number of scenes there may be contained on a strip of film. Each of the bars 3, 3', $3^2$—$3^{15}$ on its outer face bears numbers running from 1 to a maximum number, which numbers denote the light desired for particular scenes. The numbers on the bars 3, 3', $3^2$—$3^{15}$ are arranged so that there is a number opposite each contact piece or strip I, II—XX. Mounted on each of the bars 3, 3'—$3^{15}$ is a contact slide 4 or the like which extends rearwardly and is adapted to make contact with one contact piece or strip at a time. Thus for instance, in the position shown in Fig. 1, the contact slide 4 on the uppermost bar 3 is shown to occupy the position "12" and to contact with the piece or strip XII. At the back of the board 1 and suitably attached to it is a rheostat 5 of the well known construction, with which the different contact pieces I, II—XX are electrically connected by wires 6 leading from points $6'$, $6^2$, $6^3$—$6^{20}$ at the lower end of the contact strips I, II—XX as shown in Figs. 2, 3 and 5. The rheostat is connected to one pole of the main electric source (not shown) by wire 7 (Figs. 2 and 4).

The horizontal bars 3, $3'$—$3^{15}$ are each electrically connected at the rear of the board by wires 9, $9'$, $9^2$—$9^{15}$ leading from points 8, $8'$—$8^{15}$ to corresponding points 10, $10'$, $10^{15}$ of metal plates 11, $11'$, $11^2$—$11^{15}$ arranged at the side of the horizontal bars 3, $3'$—$3^{15}$ and adjacent thereto. The number of metal plates 11, $11'$—$11^{15}$ corresponds to that of the horizontal bars 3, $3'$—$3^{15}$. The plates 11, $11'$—$11^{15}$ are somewhat narrower and arranged nearer to one another than the horizontal bars 3, $3'$—$13^{15}$ so that the set of bars or plates 11, $11'$—$11^{15}$ occupy a smaller space on the board than is occupied by the set of bars 3, $3'$—$3^{15}$.

Fixed to the board on the face on which the plates 3 and 11 are provided are two pairs of brackets 12, 13 in which two parallel vertical guide rods 14 are fixed, which serve as guides for a vertical rack 15. This vertical rack is at its lower end fixed to a weighted horizontal arm 16 slidably engaging the vertical rods 14 and one end of which projects above the space occupied by the plates 11, $11'$—$11^{15}$ and carries a contact 17 adapted to make contact with one of the contact pieces or metal strips 11, $11'$—$11^{15}$ at a time. This contact piece 17 carries the wire 18 leading to the other pole of the electric source (not shown) as seen in Figs. 1 and 2 and indicated in Fig. 4. Coöperating with this rack is a spring actuated double pawl 20 which is pivoted in a bracket 21 fixed to the board. There are as many teeth in the rack 15 as there are plates 11, $11'$—$11^{15}$ or bars 3, $3'$—$3^{15}$ and they are spaced so as to correspond with the spacing of the plates 11, $11'$, $11^2$—$11^{15}$ (Figs. 2 and 7).

The teeth of the pawl 20 are arranged to be alternately brought into engagement with the rack, one tooth serving as an auxiliary means to prevent the rack from moving at a time any more than a distance between two successive teeth of the rack. This pawl is controlled from an electro-magnet 19 which is energized from the circuit of the battery $f$ which circuit is controlled by the aforenamed switch or click $e$ (Figs. 2, 4 and 7).

The mode of operation is as follows:

Preparatory to printing the film the slides 4 are adjusted on the bars 3, $3'$—$3^{15}$ in accordance with the different lights desired for the different scenes, that is to say, assuming there are three scenes on the film and that bar 3 is for the first scene, bar $3'$ for the second and bar $3^2$, for the third and assuming that the first scene requires light indicated by the number 12 on the bar 3, the second scene requires light indicated by the number 6 on bar $3'$ the third scene requires light indicated by the number "14" on bar $3^2$, then the slides 4 of the respective bars 3, $3'$, $3^2$ are shifted so that the pins or slides 4 will tally with the said numbers "12", "6" and "14". After this adjustment was done, and the machine started the attendant may, if he desires, leave the machine to itself. The film will be fed automatically in well known manner from roller $a$ to roller $d$. The rack at the start of the printing operation occupies the highest position, that is, where the contact 17 makes contact with the upmost plate or strip 11. As a notch $b^a$ of said film $b$ arrives opposite the click $e$, i. e. at the end of the first scene it closes in well known manner the circuit of the battery $f$, thereby energizing the electromagnet 19. The electromagnet attracting the pawl 20 releases one of its teeth from the rack 15, so that the latter is allowed to drop a distance equal to the space between two teeth of said rack, at which time the other tooth of the rack engages the rack, stopping its further movement. With the displacement of the rack the pin or contact 17 has been shifted from plate or strip 11, to strip $11'$. Now while the contact 17 was in contact with plate 11, the light required for the first scene and indicated by the number "12" on plate 3 was obtained, as the electric circuit controlling that light was flowing from the electric source, through the rheostat 5, to point $6^{12}$ of contact piece XII then over pin 4 to plate 3, thence from point 8 through wire 9 to point 10 of plate 11, thence through contact 17 and wire 18 back to the electric source. Now that the contact 17 has been shifted from plate 11 to plate $11'$ owing to movement of the rack under the control of the pawl 20 and electromagnet 19, the circuit through plates 3 and 11 has been broken and a circuit closed passing through plates $3'$ and $11'$. Owing to previous adjustment of contact slide 4 on bar $3'$ to tally with number "6" and contact with metal strip "VI" the light controlling circuit leading to rheostat will now flow through contact piece "VI". The light required for the second scene on the film $b$ will have been thus automatically adjusted. As the feed of the film continues and the notch $b^a$ has left the click the circuit of the battery $f$ is broken, the electromagnet 19 disenergized and the pawl 20 under the pressure of its spring 20⁸ or by gravity swings back into its initial position, engaging the rack in its adjusted position and holds it there until the next operation which takes place when at the passage to the next scene, the respective notch on the film causes the click $e$ to again close the circuit of the battery $f$. By this second closure of the battery circuit, the electromagnet again is energized and attracts pawl 20 permitting the rack 15 and consequently the contact 17 to move down to make contact with contact plate 11². The bar 3² by the previous adjustment of pin 4 to number "12", is connected to contact strip XIV so that the light for the next scene will now be automatically obtained.

It is, of course, understood that pawl 20 must be so constructed that while it is being attracted by the electromagnet, one of its teeth, in the case shown, the upper tooth, will first release the rack 15 before the lower or opposite tooth will engage with it, so as to permit the rack to move the distance between two teeth. On the other hand, when the upper tooth is released and the pawl swings back to initial position, the lower tooth must hold the rack 15 until the upper tooth engages it in order to prevent the slipping of the rack.

While I have described in detail the structure of my new device, I do not wish it to be understood as limiting myself to the particular structure, for it will be clear that various changes may be made in the structure by those skilled in the art without departing from the spirit of my invention.

I therefore claim and desire to secure by Letters Patent:—

1. In film printing machines, a light controlling mechanism, comprising a manually operated switch board for controlling the circuit of an electric source, a rheostat therefor, electric connections between the same, a set of contact pieces electrically connected with different parts of said switch board, an electromagnet, an automatically controlled switch for a circuit of an independent electric source controlling said electromagnet and means controlled by said electromagnet to automatically adjust the electric connection between said contact pieces and the main electric source.

2. In a film printing machine, the combination with a notched film and a circuit closing means controlled thereby, of an electro-magnet energized by the circuit of an electric source controlled by said circuit closing means, a rheostat, a manually operated switch for a circuit of an independent source passing through said rheostat and including electric light and means controlled by said electro-magnet and adapted to automatically control said last named electric circuit through said rheostat and adjust the light according to the previous adjustment of the manual switch.

3. In a film printing machine, the combination with a notched film and a circuit closing means controlled thereby, of an electro-magnet energized by the circuit of an electric source controlled by said circuit closing means, a rheostat, a manually operated switch for a circuit of an independent source passing through said rheostat and including electric light and an electric switch controlled by said electro-magnet and adapted to automatically control said last named electric circuit through said rheostat and adjust the light according to the previous adjustment of the said manual switch.

4. In a film printing machine comprising a film, a light controlling device comprising an electromagnet controlled by said film, a rack controlled by said electromagnet and carrying a contact piece, and a set of contact pieces which coöperate with said first named contact piece to form a switch.

5. In a film printing machine, the combination with a notched film and a circuit closing means controlled by said film, of a light controlling device, comprising an electromagnet controlled by said click, a rack controlled by said electromagnet, and carrying a contact piece and a set of contact pieces which coöperate with said first named contact piece to form a switch.

6. In a film printing machine, the combination with a notched film and a circuit closing means controlled by said film, of a hand operated switch, an electromagnet controlled by said click, a rack controlled by said electromagnet and carrying a contact piece, and a set of contact pieces which coöperate with said first named contact piece and which are electrically connected to said hand operated switch.

7. In a film printing machine, a light controlling mechanism, comprising a manually operated switch board for controlling the circuit of an electric source, a rheostat therefor, electric connections between the same, a set of contact pieces electrically connected with different parts of said switch board, an electromagnet, an automatically controlled switch for a circuit of an independent electric source controlling said electromagnet, and a rack controlled by said electromagnet and adapted in coöperation with said contact pieces to automatically adjust the electric connections between said contact pieces and the main electric source.

8. In a film printing machine, a light controlling mechanism, comprising a manually operated switch board for controlling the circuit of an electric source, a rheostat therefor, electric connections between the same, a set of contact pieces electrically connected with different parts of said switch board, an electromagnet, an automatically controlled switch for a circuit of an independent electric source controlling said electromagnet, a rack controlled by said electromagnet and carrying a contact piece coöperating with said set of contact pieces and adapted to automatically adjust the electric connection between said contact pieces and the main electric source.

9. In a film printing machine, the combination with a notched film and a circuit closing means controlled by said film, of a light controlling mechanism, comprising a manually operated switch board for controlling the circuit of an electric source, a rheostat therefor, electric connections between the same, a set of contact pieces electrically connected with different parts of said switch board, and an electromagnet controlled by said click and carrying a contact piece coöperating with said set of contact pieces to automatically adjust the electric connection between said contact pieces and the electric source.

In testimony whereof I affix my signature in presence of two witnesses.

ADOLF WOLFSOHN.

Witnesses:
F. D. JUNIOR,
D. KLEIN.